Patented Dec. 17, 1929

1,739,597

UNITED STATES PATENT OFFICE

JOHN J. KESSLER, OF ST. LOUIS, MISSOURI

INDURATED POROUS OBJECT AND PROCESS FOR MAKING SAME

No Drawing.   Application filed September 24, 1928. Serial No. 308,130.

The object of my invention is to produce an indurated porous object by a process which fills the pores of the object with a hard, tough, non-blistering, water-proofing and electrical insulating organic material. This organic material is a drying and polymerizing oil. The method of preparing this oil and the properties of this oil are both described in my U. S. Patent No. 1,616,321 patented February 1, 1927.

Indurate, primarily means to make more durable, resistant to mechanical wear as well as chemical action, and it follows as a secondary or derived meaning, to harden, to waterproof, to increase the electrical resistance and disruptive breakdown.

By porous objects I mean generally that class of materials which contains pores or interstices, and which are therefore more or less absorbent. Examples of porous materials are wood, paper, various fibrous materials, electrical coils, unglazed porcelain, asbestos board. These examples are given merely by way of illustration.

Where I use the term porous objects throughout this specification and claims, it is used in the general meaning as including any material or combination of materials which is in whole or in part porous or absorbent.

My improved method of indurating porous objects comprises the use of a general class of indurating material and this general class of indurating material may be briefly described as the drying and polymerizing oil which is formed by the action of bodies containing a mobile methylene group upon coal tar fractions boiling between 150° C. and 250° C.

A more detailed description of this drying and polymerizing oil will now be given.

In preparing the polymerizing and drying oil which is used in the process which I am now describing for indurating porous objects, I start with a fraction of coal tar which has a boiling point range between 150° C. and 250° C. without limiting myself to exactly this boiling range. I treat this coal tar fraction with an amount of formaldehyde or other chemical bodies containing an aldehyde group or of mixtures of chemical bodies which produce by their reaction what is known as an active methylene group.

This is substantially what is involved in the reaction and formaldehyde or other aldehydes are only two particular ways of utilizing active methylene groups.

In the preparation of the oil used in this process I start with a coal tar fraction which boils between approximately 150 and 250° C. This fraction consists of a number of chemical bodies, some of which have been identified, but many of which have not been identified as chemical individuals.

Among the chemical bodies which may be identified are the phenols or tar acids, naphthalene, coumarone and indene. A portion of this oil goes under the name of creosote oil and contains hydrocarbons, saturated and unsaturated together with various compounds of carbon hydrogen and oxygen, traces of compounds of carbon hydrogen and nitrogen. Usually such an oil will contain 20% to 50% of phenols or tar acids. The balance of the oil will consist of creosote oils which have been partly described as to their chemical character in the foregoing, but which are as already intimated of more or less indefinite chemical composition.

The properties of the drying and polymerizing oil which I use in this process do not depend upon the presence of any particular chemical individuals, but they depend upon the presence of the various constituents which are found in the coal tar fraction specified. The polymerizing of the oil depends, for instance, upon the presence of the phenols, but the drying qualities of the oil depend not only upon the phenols, but upon the various other bodies present, because after the phenols are removed from the coal tar fraction, a drying oil can still be made by my process from the remaining fractions. Furthermore, the properties of the finished product depend upon the mutually solvent action of the various constituents of the fraction, which solvent action is mutual whether the oil is in an undried, dried or polymerized condition.

When such a mixture of oils is subject to the action of formaldehyde or similar substances which may be defined from the standpoint of chemical theory as containing a mobile methylene group, the phenol groups are acted upon to form polymerized resinous substances, but the action is somewhat different from the well known reaction whereby pure phenol is reacted upon by aldehyde bodies. Reaction takes place at a higher temperature; it is slower and it requires no pressure in order to prevent the formation of gas bubbles during the last stages of the reaction. Besides this, the reaction products are mutually soluble in each other and in the neutral bodies present in the mixture, so that no separation takes place. A thin film of the finished product dries to a homogenous transparent film, consisting of a solid resinous-like mass without gas bubbles and of considerable strength and toughness. In the reaction which I am describing it is worthy of note that the substances present of phenolic character are very much less in proportion than the other bodies present, but it is a fact that out of such a mixture which is originally oily and liquid a solid product can be produced either by oxidization or by polymerization.

In carrying out my invention I start with a fraction of coal tar oil which has a boiling point range between 150° C. and 300° C. without limiting myself to exactly this boiling range. I treat this oil with an amount of formaldehyde or of other aldehyde which is in excess of the amount required to completely polymerize the phenols present. In order to accelerate the reaction, a basic catalyst, such as ammonia or sodium hydrate, may be added to the reacting mixture. I continue the heating until a liquid is obtained of the required viscosity. I find a temperature of about 150° C. to be practical temperature to conduct this heating. In order to illustrate the change which takes place in the viscosity of the oil on subjecting it to this treatment I will say that a coal tar fraction, such as I have described, will have a viscosity when measured by a Saybolt instrument at 100° F. of 20–50. After the reaction has proceeded to a practical degree of producing the finished product, the viscosity in the oil has been increased to 200–500 at the same temperature. The oil has, therefore, taken on considerable body and has valuable properties for the induration of porous objects.

Having described the drying and polymerizing oil which I use for indurating porous objects, I will now describe the process or method of bringing about this induration.

The first step in the process consists in the saturation of the porous object with the drying and polymerizing oil. This may be brought about by merely dipping the object to be indurated in the oil, or, the saturation may be facilitated by operating under pressure.

The degree of saturation or of impregnation may be varied by varying the time or pressure used. Any degree of saturation or of impregnation will depend upon the detailed results to be accomplished.

The second step in the process consists in solidifying and hardening the drying and polymerizing oil used for the saturation or impregnation of the porous object. This is accomplished partly by the removal of the volatile constituents of the oil through evaporation, partly by the oxidation of the residual solid material and partly by the polymerization of the residual solid material.

All three processes, evaporation, oxidation, and polymerization, are hastened by the effect of heating.

In some cases it is desirable to complete the process while the object to be indurated is being pressed in a mould in which case it is possible to prepare an indurated object of uniform dimensions, greater smoothness and greater density.

I am aware that various processes have been described for indurating, moulding, and otherwise fabricating objects which contain phenol aldehyde resins as an indurating material.

My process differs from processes previously described in two manners, a chemical manner and a physical manner. From a chemical standpoint, my process differs from processes involving the use of phenol aldehyde resins in that there are present in my drying and polymerizing oil many other substances beside phenol aldehyde resins, in fact, as shown in my United States Patent No. 1,616,321 there are cases in which phenols may be entirely absent from the drying and polymerizing oil described in my United States Patent No. 1,616,321 and still useful and desirable materials are still obtained. From a physical standpoint I find advantages in the use of a drying and polymerizing oil in which the finished product has the same boiling range as the raw material from which it is made. The advantages which I find consist of a uniformity of drying and of polymerization, with a consequent freedom from blistering, with a uniform shrinkage, and with a smoothness of finish which are all results due to the fact that the boiling range of the finished product is the same as that of the raw material from which it is made.

I claim:

1. The process of indurating porous objects which comprises the saturation of the object with a drying and polymerizing oil prepared by the action of chemical bodies having a mobile methylene group upon tar fractions having a boiling range between 150° C. and 250° C.

2. The process of indurating porous objects which comprises the saturation of the object with a drying and polymerizing oil prepared by the action of chemical bodies having a mobile methylene group upon tar fractions having a boiling range between 150° C and 250° C. and finally the baking of the object.

3. The process of indurating porous objects which comprises the saturation of the object with a drying and polymerizing oil prepared by the action of chemical bodies having a mobile methylene group upon coal tar fractions having a boiling range between 150° C. and 250° C.

4. The process of indurating porous objects which comprises the saturation of the object with a drying and polymerizing oil prepared by the action of formaldehyde upon tar fractions having a boiling range between 150° C. and 250° C.

5. The process of indurating porous objects which comprises the saturation of the object with a drying and polymerizing oil prepared by the action of formaldehyde with the addition of a catalyst upon tar fractions having a boiling range of 150° C. and 250° C.

6. The process of insulating magnet wire which comprises the saturation of the porous covering of the wire with a drying and polymerizing oil prepared by the action of chemical bodies having a mobile methylene group upon tar fractions having a boiling range of 150° C. to 250° C.

7. The process of insulating magnet wire which comprises the saturation of the porous covering of the wire with an insulating compound containing a drying and polymerizing oil prepared by the action of chemical bodies having a mobile methylene group upon tar fractions having a boiling range of 150° C. to 250° C.

8. As an article of manufacture a porous object which has been indurated with a drying and polymerizing oil prepared by the action of chemical bodies having a mobile methylene group upon tar fractions having a boiling range of 150° C. to 250° C.

In testimony that I claim the foregoing I hereunto affix my signature.

JOHN J. KESSLER.